Aug. 24, 1965  A. W. KATH  3,202,151
MULTIDOSE JET INJECTOR
Filed April 8, 1963  3 Sheets-Sheet 1
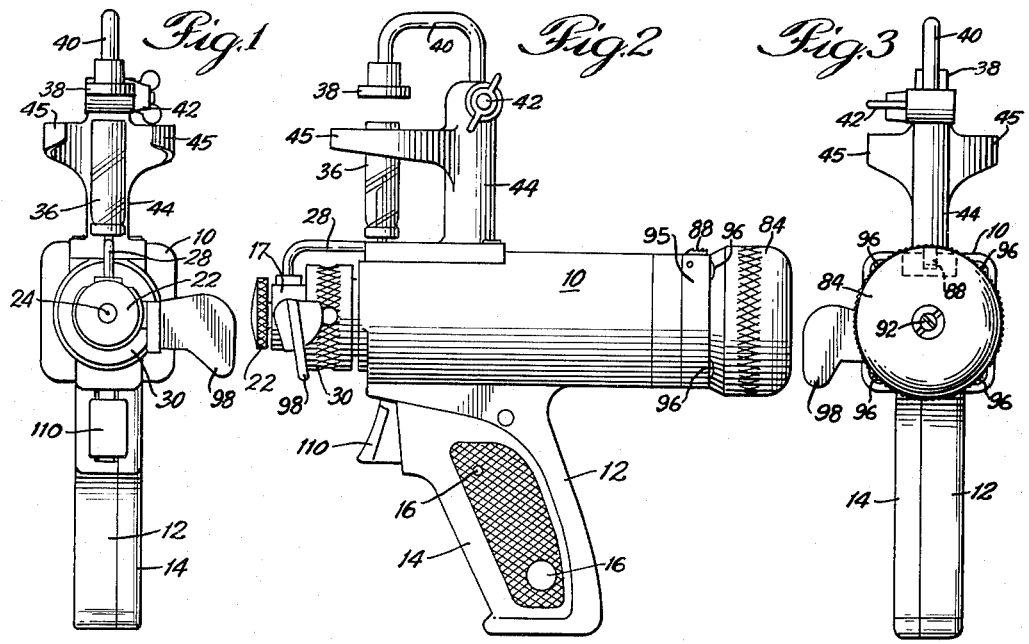
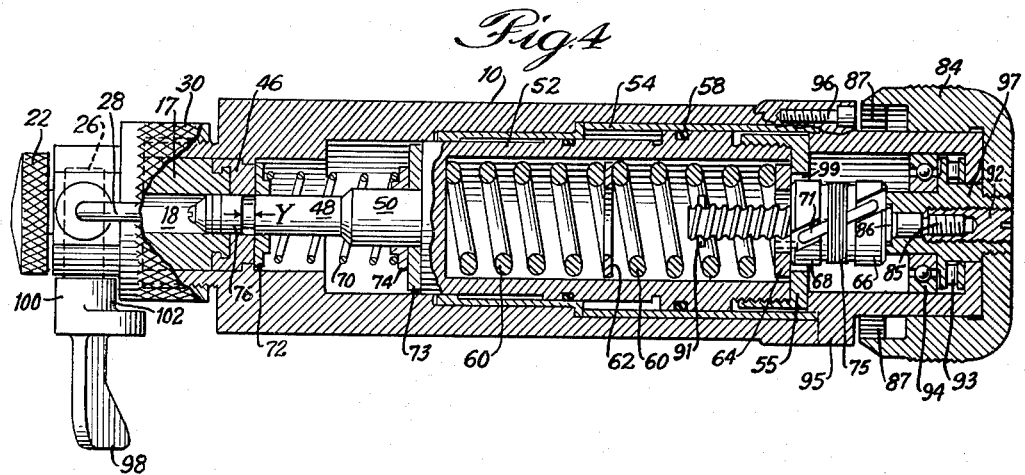
INVENTOR:
Alfred W. Kath,
BY Bair, Freeman & Molinare
ATTORNEYS.

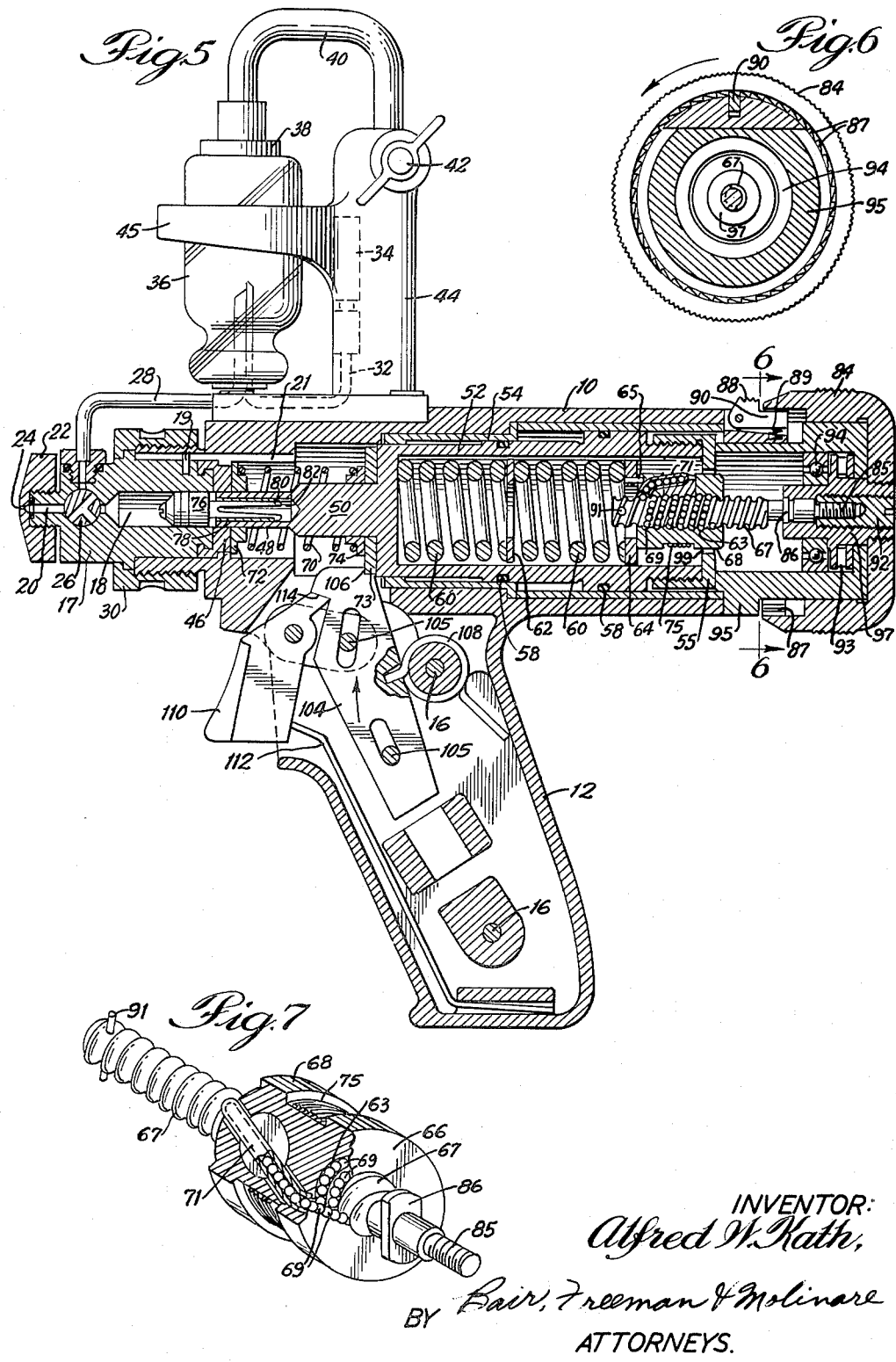

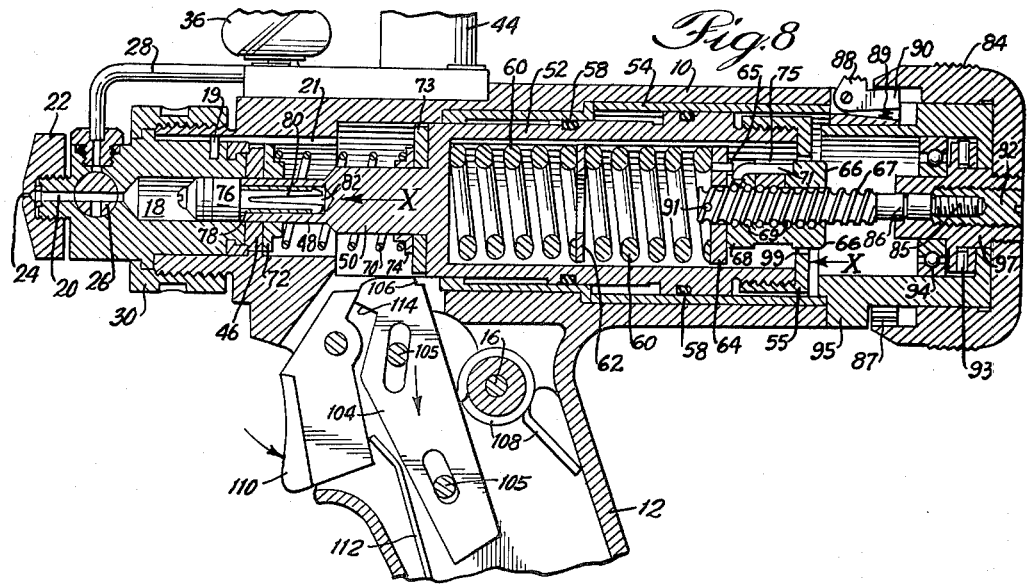
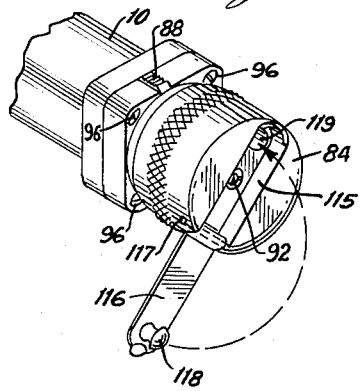
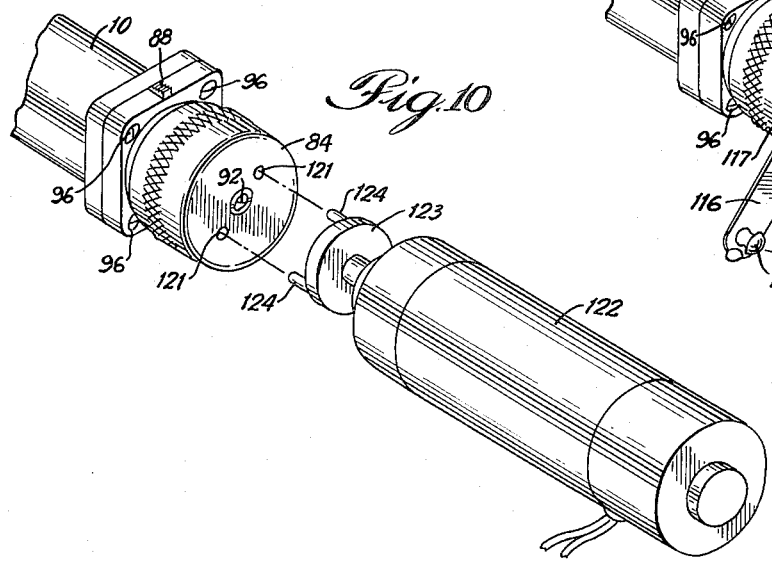
INVENTOR:
Alfred W. Kath,
BY Bair, Freeman & Molinare
ATTORNEYS.

United States Patent Office 3,202,151
Patented Aug. 24, 1965

3,202,151
MULTIDOSE JET INJECTOR
Alfred W. Kath, Grosse Pointe, Mich., assignor to R. P. Scherer Corporation, Detroit, Mich., a corporation of Michigan
Filed Apr. 8, 1963, Ser. No. 271,205
4 Claims. (Cl. 128—173)

This invention relates to a multidose injector capable of administering one injection after another. It is an improvement upon the multidose injector disclosed in my copending application S.N. 142,083, filed October 2, 1961, now Patent Number 3,123,070. In that the manual or hand compressing operation is more easily applied and also it is readily adaptable to motor operated compressing, the term "compressing" meaning to place the injector in condition for giving an injection.

One object of the invention is to provide an injector which will discharge medicament or other fluids from a tiny orifice in a minute stream or jet by means of springs or the like which are compressed by the motion of a novel compressing device, which jet will be at a sufficiently high pressure to pierce the skin and force the fluid to a predetermined depth beneath the surface thereof. Two stage injection such as disclosed in my aforesaid patent may also be utilized, if desired.

Another object of the invention is to greatly facilitate the compression whether done manually or by power, and particularly to reduce the amount of energy required per turn of the compressing device over that required in my copending application S.N. 142,083; also to provide a less cumbersome manual compressing device than that disclosed in said application.

A further object of the invention is to provide as a converter from rotary to linear motion for the compressing device of a needleless hypodermic injector a commercially available converter which utilizes continuously recirculating balls rolling in helical grooves which provide ability to carry heavy loads with low friction and high efficiency.

Still a further object of the invention is to provide a mechanically simple non-back-up device for such a converter for a needleless hypodermic injector.

Another object of the invention is to provide such a converter with a power source including a relatively high speed reduction means.

A very important object of the invention is to provide for automatic return of the converter to its initial position prior to compressing the springs of the injector and at the same time to again fill the medicament chamber of the injector by the release of a latch or the like and by positioning a valve so that medicament may be drawn into the medicament chamber as the converter returns.

A further object of the invention is to provide a small pivoted crank for rotating the converter while compressing but which may be swung out of the way during automatic return of the converter.

With these and other objects in view, my invention consists in the construction, arrangement and combination of the various parts of my multidose jet injector, whereby the objects above contemplated are attained, as hereinafter more fully set forth, pointed out in my claims and illustrated in detail in the accompanying drawings, wherein:

FIG. 1 is a front elevation of a hypodermic injector embodying my present invention;

FIG. 2 is a side elevation thereof;

FIG. 3 is a rear elevation thereof;

FIG. 4 is an enlarged horizontal sectional view of a portion of the injector showing the parts at an initial or "at rest" position;

FIG. 5 is an enlarged vertical sectional view of the injector showing the spring assembly compressed and the medicament valve partially operated from the pre-filll position, but not as yet in the injecting position;

FIG. 6 is a sectional view taken along line 6—6 of FIG. 5;

FIG. 7 is a perspective view, partially cut away, of the ball bearing type motion converter utilized in the present invention;

FIG. 8 is a partial sectional view of the hypodermic injector in the position where it has partially moved to discharge medicament;

FIG. 9 is a modification of the rotatable knob for the motion converter with a recessed pivoted handle thereon; and FIG. 10 is another embodiment of the invention wherein an electric motor is substituted for manual operation, if electric power is available, but in which the injector may still be operated manually.

Referring specifically to the drawings for a detailed description of the invention, the main body of my injector shown at 10 is tubular in character and is provided with a handle or grip 12. The body 10 and handle 12 are preferably formed integrally to prevent any possibility of misalignment of parts as when made separately and connected together.

The near side of the handle, as shown in FIG. 5, however, is open for assembly purposes and a cover plate 14 is secured thereto by a pair of screws 16 after assembly.

Referring to FIGS. 4, 5 and 8, at the left hand end of the body 10 is a medicament chamber 18 formed in member 17 held in position by a retainer nut 30. A pin 19 and a keyway 21 prevent rotation of the member 17 relative to the body 10. The medicament chamber 18 has a discharge passageway 20. Cooperating therewith, is a discharge nose 22 and a minute discharge orifice 24 from which the jet stream issues during the operation of the injector. A valve 26 is rotatable in the medicament chamber 18 and controls the flow of medicament as between the chamber and the discharge passageway 20 and between the chamber and a medicament tube 28 adapted to receive medicament from a bottle 36. A vent tube 32 extends from a filter 34 into the medicament bottle to replace the medicament flowing therefrom with filtered air.

A hold-down pad is provided for the bottle 36 and is supported by a U-shaped rod 40 and a lock screw 42. The rod is slidable in a bracket 44 mounted on the body 10 and may be locked in any desired position by means of the lock screw 42. Bottle holding arms 45 extend from the bracket 44 to embrace the bottle 36.

The medicament chamber forming member 17 has an extension 46 through which a spring actuated plunger 48 is slidable. The plunger is enlarged at 50 and further enlarged into a spring cup 52. The spring cup is slidable in a sleeve 54 and that lines the body 10 and is held in position therein by a retainer nut 55. O-ring seals 58 are provided.

Within the spring cup 52 is a spring assembly 60 which may be either a single spring or two springs as illustrated with a spacer washer 62 between them. The spring assembly 60 is precompressed to a predetermined degree in this case preferably about 170 pounds and held in that condition by a precompression head 64.

A device for converting rotating motion to linear motion is provided for compressing the springs 60 and is generally shown in FIG. 7 by the numeral 66. The motion converter is known as a precision ball screw converter and consists of two main components, namely, a screw 67 with circular-form threads and a nut assembly 68 with an internal helical ball groove 63 to permit the flow of a continuous row of steel balls 69. Rotation of either the screw or nut causes the rolling balls to move along the helical path. The balls travel at approximately half the speed of the races and exit at the trailing end of the nut 68. To maintain continuous rotation of the balls in the system, a return tube 71 deflects and recirculates the balls to the leading end of the nut.

The motion converter 66 is also provided with a wire wrapping 75 to retain the return tube 71 in position. In addition, a threaded extension 85 is provided on one end of the screw 67 as well as a key 86, for purposes hereinafter described.

As shown in FIG. 4, the spring cup 52 confines the left hand end of the spring assembly whereas the right hand end is confined by the head 64.

A refill spring 70 is provided surrounding the spring actuated plunger 48 and the enlargement 50 and bears against washers 72 and 74, which in turn bear against the extension 46 and latch washer 73 positioned against the left hand end of the spring cup 52.

A medicament plunger 76 is slidable in the medicament chamber 18 and has a shank 80 entering bore 82 of the plunger 48. A sleeve 78 is secured in the bore 82 and the shank 80 has some lost motion within the bore being provided with an enlarged head to co-act with the sleeve 78 to prevent the shank from being pulled out of the plunger. The shank 80 is split in the form of a cross and is of such size that the enlarged head at the right hand end thereof frictionally engages in the bore 82.

The motion converter 66 is assembled into the instrument and is provided with a winding knob 84. The winding knob 84 is eventually screwed on to the screw 85 and is provided with ratchet teeth 87 on the internal surface thereof at the forward or left hand end. A rewind release lever 88 biased upwardly by a spring 89 is connected to a dog 90 so that the ratchet may be engaged by the dog during winding of the knob 84 but may be released for rewinding or resetting. A stop or limit pin 91 is provided on the screw 67 at one end thereof and the other end of the converter 66 has its motion limited by a bushing 97 which bushing is retained in position in a converter bearing cage 95 by screw 92, the converter bearing case 95 being in turn held in position on the body 10 by screws 96. Also provided in the assembly is a needle thrust bearing 93 and a ball bearing 94 as shown in FIGS. 4, 6 and 8.

In assembling the converter 66 it is first positioned with the nut 68 extending freely through an opening 99 in the retainer nut 55 with the helical screw 67 extending into the spring and with the left hand end of the nut engaging the head 64. The head 64 is connected to the nut 68 by a pin 65 to prevent relative rotation between them. Thereafter the bushing 97 is screwed onto the extension 85 of the converter 66, the bearings 93 and 94 are assembled, the converter is screwed to the body 10, the ratchet dog and release lever are assembled and the winding knob 84 is finally secured by the screw 92. The bushing 97 is provided with a recess to engage the key 86 so that rotation of the screw 67 is insured when the winding knob 84 is rotated.

A latch plate 104 is slidably mounted on a pair of pins 105 and biased in an upward direction by a spring 108. The latch plate 104 has a latch shoulder 106 adapted to co-act with the latch washer 73 as shown in FIG. 5. Both the latch plate washer 73 and the latch plate 104 are hardened to minimize wear. A trigger 110 is pivotally mounted in the handle 12 and biased to the position shown in FIG. 5 by a spring 112. The trigger normally co-acts with a shoulder 114 on the latch plate 104 also as shown in FIG. 4.

*Practical operation of FIGURES 1 through 8*

In the operation of my multidose jet injector, as disclosed in FIGS. 1 through 8, starting with the parts in the positions shown in FIG. 4 and assuming the medicament chamber 18 is filled with medicament ahead of the plunger 76, the handle 12 is held in one hand while the other hand rotates the knob 84 in a clockwise direction in FIG. 3 to impart rotation to the screw 67 in the same direction thus forcing the nut 68 to the left and moving the plate 64 which is in heavy frictional engagement by reason of the precompression of the springs 60. Such movement compresses the springs 60 and the return spring 70 to the positions shown in FIGS. 5 and 8 in which positions the instrument is ready to inject, assuming a charge of medicament has been drawn into the medicament chamber 18. The valve 26 at this time is in the position shown in FIG. 5 having been rotated to that position by operation of a valve operating lever 98, which is provided with stop shoulders 100 and 102.

The nose 22 is now placed in contact with the injection site and the trigger 110 pulled for removing its upper end from under the latch shoulder 114 so that the latch plate 104 will be propelled forwardly and downwardly by the latch washer 73 against the latch shoulder 104 in cooperation with the pins 105 in the slots in the latch plate. The slots are set at such angles as to permit the pressure of the spring assembly 60 against the latch washer 73 to move the latch plate downwardly against the bias of the spring 108. Thereupon the spring assembly will move the spring cup 52 and the plunger 48 forwardly in direction X of FIG. 8 until the plunger engages the medicament plunger 76 taking up the impact space Y shown in FIG. 4 so that the initial impact will build up a sudden high pressure discharge from the orifice 24 sufficient to puncture the epidermis and cause the jet to penetrate to some depth therebeneath. The pressure then drops off when the impact has been spent and thereafter a steady follow-through pressure caused by the expansion of the spring assembly 60 forces the medicament plunger 76 forwardly in the medicament chamber 18 to cause a lower pressure follow-through jet to discharge the medicament through the puncture in the epidermis and the underlying cells and be dispersed at the level at which the impact produced jet penetrated.

FIG. 8 shows the impact space Y taken up and when the plunger 76 reaches the forward end of the chamber 18, the spring assembly 60 will be completely expanded, the start of such expansion being shown in FIG. 8. The parts will then be in a forward position and ready for return to the initial position of FIG. 4.

In order to return the injector to the position shown in FIG. 4, and to fill the medicament chamber 18 with medicament from the bottle 36, the lever 98 for rotating valve 26 is first rotated to the position wherein the passageways will effect communication between the bottle and the medicament chamber. In other words, wherein the cross passageway in valve 26 is vertical and the short passageway communicates with the medicament chamber 18.

The dog 90 is released by pressing on the lever 88 and the force stored in the return spring 70 will move the cage 52 and the precompression head 64 to the right, thus forcing nut 68 in the same direction and rotating the screw 67 and knob 84. The rotation of the knob 84 will be rapid and of course medicament will be sucked into the chamber 18. The trigger release will be relatched and when the valve 26 is again moved to the position shown in FIG. 8, by rotation of the lever 98, the instrument will be in condition to administer the succeeding injection.

*Construction and operation of FIG. 9*

FIG. 9 illustrates the modification of the winding mechanism, particularly as applied to the knob 84 of FIGS. 1 through 8, conclusive. As shown, the knob 84 is provided with a recess 115 for normally containing a winding handle 116 which is pivoted at 117. The handle 116 is provided with a latch pin 118 which engages a recess 119 in the handle 84 to retain the handle 116 in the closed position. When it is desired to compress the spring assembly 60 the handle is positioned as shown in FIG. 9 whereupon the knob 84 may be more rapidly and easily rotated for this purpose.

*Construction and operation of FIG. 10*

FIG. 10 shows another embodiment of the invention in which the knob 84 is provided with a pair of recesses 121 and wherein an electric motor 122 which drives a head 123 is utilized for winding the knob 84. The head 123 is provided with a pair of prongs 124 which enter the recesses 121 and the knob 84 during the winding operation. Briefly the motor 122 is provided with a high-speed reduction ratio of the order of 500:1.

From the foregoing it will be apparent that I have provided and improved a needleless hypodermic injector in which the springs may be compressed either manually or by power and in which the motion converter requires very little force to operate, it is compact and provides for ready return for subsequent injections.

Some changes may be made in the construction and arrangement of the parts of the multidose jet injector herein disclosed without departing from the real spirit and purpose of my invention, and it is my intention to cover by my claims any modified forms of structure or use of mechanical equivalents which may reasonably be included within their scope.

I claim as my invention:

1. An injector instrument comprising an elongated body defining at one end a medicament chamber having a discharge orifice, a spring actuated plunger slidable within said medicament chamber, a spring assembly carried within said body between said medicament chamber and the other end of the body to actuate said plunger, a releasable latch mounted in said body and operatively associated with said spring assembly to lock said spring assembly in a compressed position, compressing means operatively associated with said spring assembly for compressing the spring assembly comprising a rotatable member having a helical groove thereon, a nut coacting with said rotatable member to be moved in a linear direction upon rotation of said rotatable member, said spring assembly being compressed between said latch and said nut when the nut is moved linearly in one direction upon rotation of said rotatable member in one direction, a plurality of friction reducing rolling balls circulating through said groove in engagement with said nut, return means for providing continuous circulation of said balls within said groove, ratchet means operatively associated with said rotatable member for preventing said spring assembly from counter-rotating said rotatable member during compression of said spring assembly, and return spring means biasing said spring assembly toward said releasable latch for engagement therewith said return spring means also serving to withdraw said plunger from said medicament chamber, and upon disengagement of said ratchet means, to counter-rotate said rotatable member by moving said nut linearly in the opposite direction.

2. An injector instrument comprising a body defining at one end an elongated medicament chamber having a discharge orifice, a spring actuated plunger slidable within said medicament chamber, a spring assembly carried within said body between said medicament chamber and the other end of the body to actuate said plunger, a releasable latch mounted in said body and operatively associated with said spring assembly to lock said spring assembly in a compressed position, compressing means operatively associated with said spring assembly for compressing the spring assembly comprising a rotatable member having a helical groove thereon, a nut coacting with said rotatable member to be moved in a linear direction upon rotation of said rotatable member, said spring assembly being compressed between said latch and said nut when the nut is moved linearly in one direction upon rotation of said rotatable member in one direction, a plurality of friction reducing rolling balls circulating through said groove in engagement with said nut, return means for providing continuous circulation of said balls within said groove, a rotatable winding member operatively connected to said rotatable member, and a motor operatively connected to said winding member for rotating said winding member, said motor including a high ratio motion reducer.

3. An injector instrument comprising an elongated body defining at one end a medicament chamber having a discharge orifice, a spring actuated plunger slidable within said medicament chamber, a spring assembly carried within said body between said medicament chamber and the other end of the body to actuate said plunger, a releasable latch mounted in said body and operatively associated with said spring assembly to lock said spring assembly in a compressed position, compressing means operatively associated with said spring assembly for compressing the spring assembly comprising a rotatable member having a helical groove thereon, a nut coacting with said rotatable member to be moved in a linear direction upon rotation of said rotatable member, said spring assembly being compressed between said latch and said nut when the nut is moved linearly in one direction upon rotation of said rotatable member in one direction, a plurality of friction reducing rolling balls circulating through said groove in engagement with said nut, return means for providing continuous circulation of said balls within said groove, and return spring means operatively associated with said plunger for prepositioning said plunger and the uncompressed spring assembly after discharge of medicament from said medicament chamber by counter-rotating said rotatable member.

4. The injector of claim 3 with releasable ratchet means operatively associated with said rotatable member for preventing said spring assembly from counter-rotating said rotatable member during compression of said spring assembly.

References Cited by the Examiner

UNITED STATES PATENTS

| | | | |
|---|---|---|---|
| 2,675,802 | 4/54 | Hein | 128—173 |
| 2,695,611 | 11/54 | Letac | 128—173 |
| 2,714,887 | 8/55 | Venditty | 128—173 |
| 2,754,818 | 7/56 | Scherer | 128—173 |
| 2,762,370 | 9/56 | Venditty | 128—173 |
| 2,875,630 | 3/59 | Gill et al. | 74—424.8 |
| 2,928,390 | 3/60 | Venditty et al. | 128—173 |
| 3,053,105 | 9/62 | Cole | 74—424.8 |

RICHARD A. GAUDET, *Primary Examiner.*
JORDAN FRANKLIN, *Examiner.*